United States Patent [19]

Cannon, Jr. et al.

[11] Patent Number: 4,787,706

[45] Date of Patent: Nov. 29, 1988

[54] DUPLEX OPTICAL FIBER CONNECTOR

[75] Inventors: Thomas C. Cannon, Jr.; Arthur W. Carlisle, both of Dunwoody; Bruce V. Darden, Lawrenceville, all of Ga.

[73] Assignee: American Telephone and Telegraph Company, AT&T Bell Laboratories, Murray Hill, N.J.

[21] Appl. No.: 10,508

[22] Filed: Feb. 3, 1987

[51] Int. Cl.[4] .................................................. G02B 6/36
[52] U.S. Cl. ............................ 350/96.20; 350/96.24; 350/96.23
[58] Field of Search ............... 350/96.20, 96.21, 96.22, 350/96.23, 96.16

[56] References Cited

U.S. PATENT DOCUMENTS

| | | | |
|---|---|---|---|
| 4,047,797 | 9/1977 | Arnold et al. | 350/96.21 |
| 4,233,724 | 11/1980 | Bowen et al. | 29/428 |
| 4,240,695 | 12/1980 | Evans | 350/96.21 |
| 4,277,135 | 7/1981 | Schrott et al. | 350/96.21 |
| 4,339,165 | 7/1982 | Malsot et al. | 339/41 |
| 4,529,263 | 7/1985 | Moriyama et al. | 350/96.20 |
| 4,611,887 | 9/1986 | Glover et al. | 350/96.21 |
| 4,634,214 | 1/1987 | Cannon, Jr. et al. | 350/96.21 |
| 4,640,575 | 2/1987 | Dumas | 350/96.20 |
| 4,657,340 | 4/1987 | Tanaka et al. | 350/96.20 |
| 4,673,242 | 6/1987 | Logan et al. | 350/96.20 |
| 4,687,291 | 8/1987 | Stape et al. | 350/96.21 |
| 4,699,462 | 10/1987 | Jones | 350/96.23 |
| 4,715,675 | 12/1987 | Kevern et al. | 350/96.20 |

FOREIGN PATENT DOCUMENTS

| | | | |
|---|---|---|---|
| 0033118 | 8/1981 | European Pat. Off. | 350/96.22 |
| 0086266 | 8/1983 | European Pat. Off. | 350/96.20 |
| 0156608 | 10/1985 | European Pat. Off. | 350/96.20 |
| 0177937 | 4/1986 | European Pat. Off. | 350/96.20 |
| 3232108 | 3/1982 | Fed. Rep. of Germany | 350/96.23 |
| 2530829 | 1/1984 | France | 350/96.20 X |
| 54-4151 | 1/1979 | Japan | 350/96.21 |
| 56-16105 | 2/1981 | Japan | 350/96.20 |
| WO86/00147 | 1/1986 | PCT Int'l Appl. | 350/96.21 |
| 1030663 | 5/1966 | United Kingdom | 350/96.21 |
| 2124793 | 2/1984 | United Kingdom | 350/96.20 |

OTHER PUBLICATIONS

Test Methods and Performance of a Multi-Channel Hermaphroditic Optical Fiber Connector, J. F. Dalgleish et al., International Wire & Cable Symposium, 1981. Tactical Fiber Optic Cable Assemblies, J. M. Anderson et al., Milcom, 1985, U.S. App. Ser. No. 887,468, filed 7/21/86, J. M. Anderson, et al.

Primary Examiner—William L. Sikes
Assistant Examiner—Brian M. Healy
Attorney, Agent, or Firm—Edward W. Somers

[57] ABSTRACT

A duplex optical fiber connector (20) includes a housing (21) having a cable entrance end and a plug end. At the cable entrance end, an optical fiber cable (23) which includes two individually buffered optical fibers (25—25), strength member yarn (29) and a plastic jacket is routed into a flanged end of a bushing (45) having a tapered passageway therethrough. The bushing is supported in a base (22) of the housing. The jacket is removed from the portion of the cable which extends from the cable entrance end to the plug end and the yarn is positioned between two conformable, truncated conically shaped, substantially smooth surfaces which define the passageway of the bushing and a truncated conically shaped wedge (50) which is received in the passageway. The wedge includes a bore through which the optical fibers extend. This locking arrangement in which the yarn makes no retroflexed turns is self-enhancing when tensile forces are applied to the cable. At the plug end are secured two plugs (70—70) each terminating one of the optical fibers. Each plug is spring-loaded and further, end portions of the plugs which protrude beyond the connector housing are protected by a bumper (90) which also is spring-loaded and which is moved inwardly when the connector is assembled to another. A cover (52) is assembled to the base to complete the housing and to secure the force-transfer facilities and plugs therein.

36 Claims, 9 Drawing Sheets

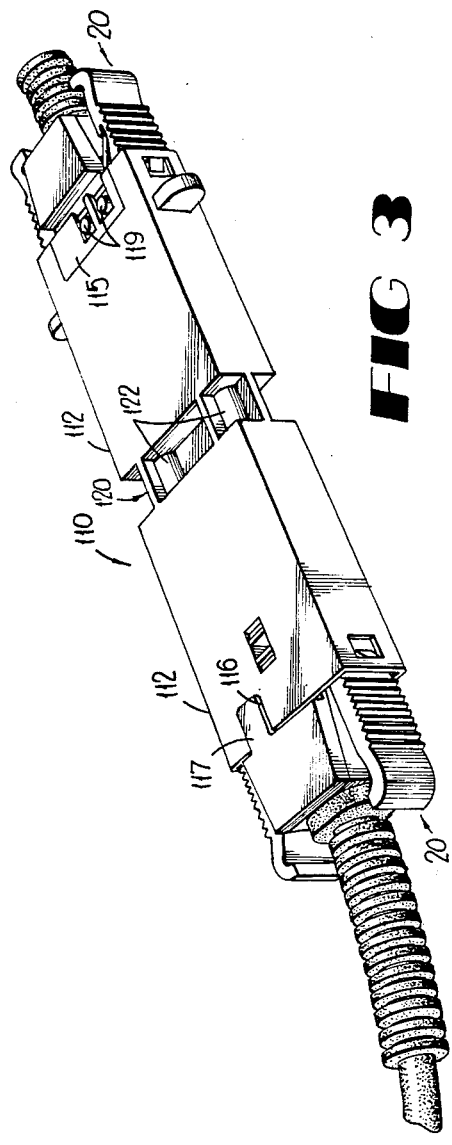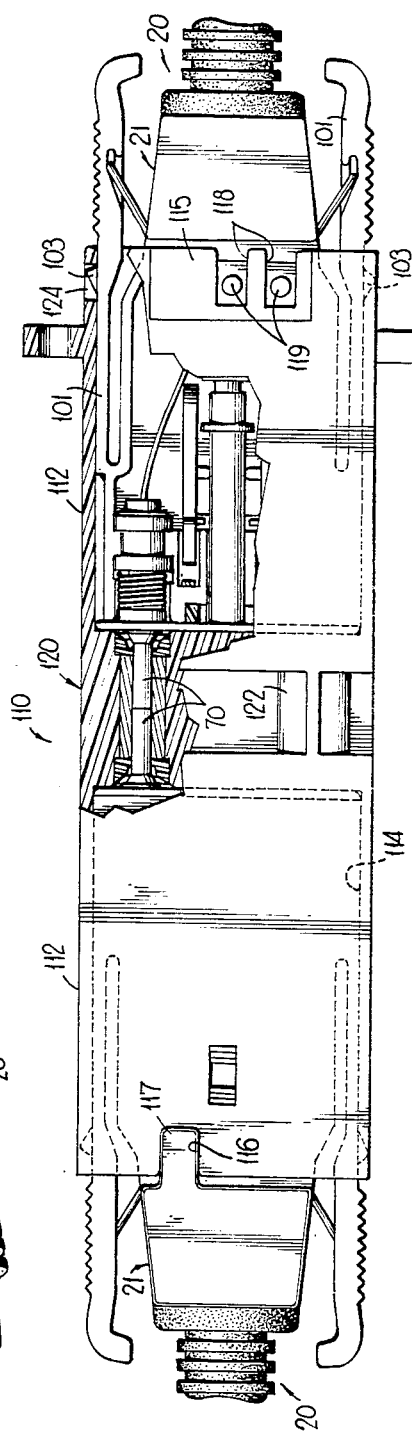

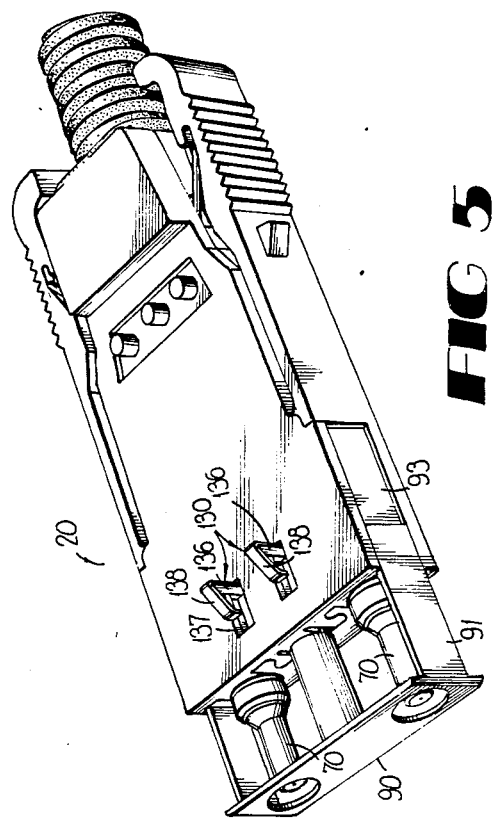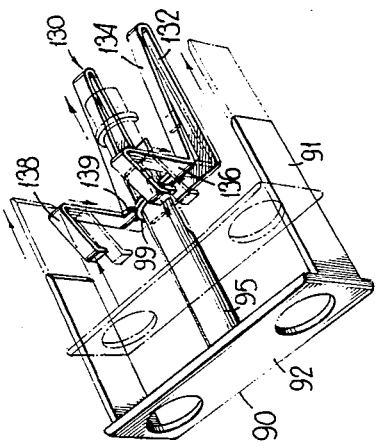
FIG 5
FIG 6

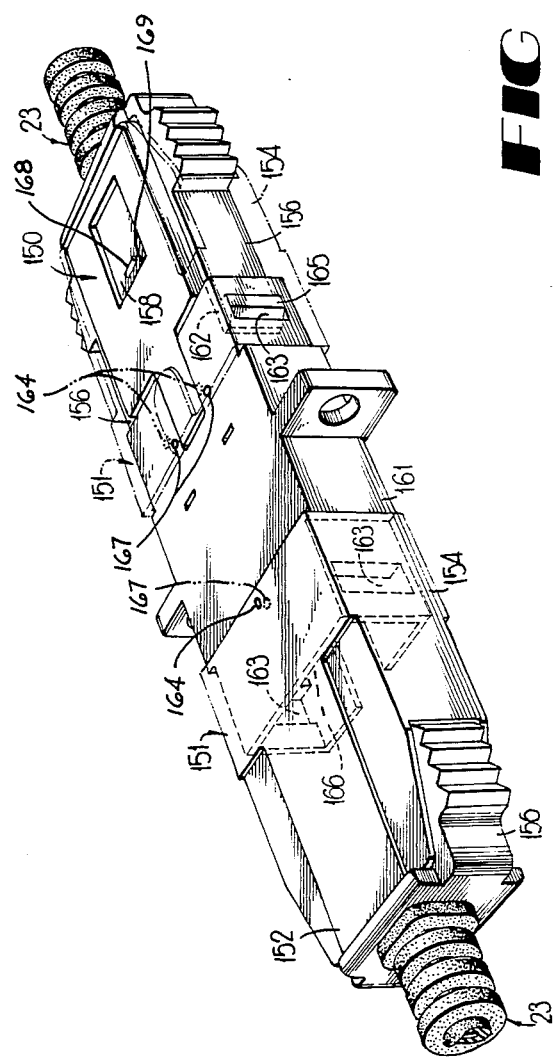

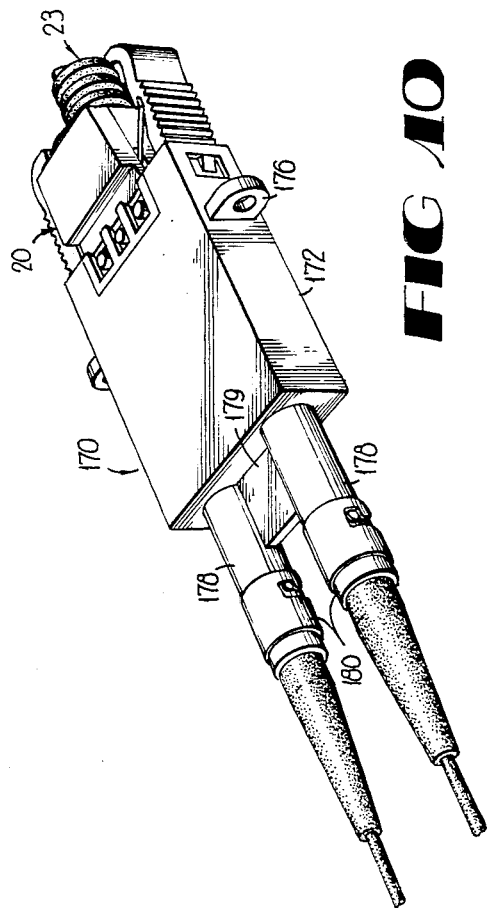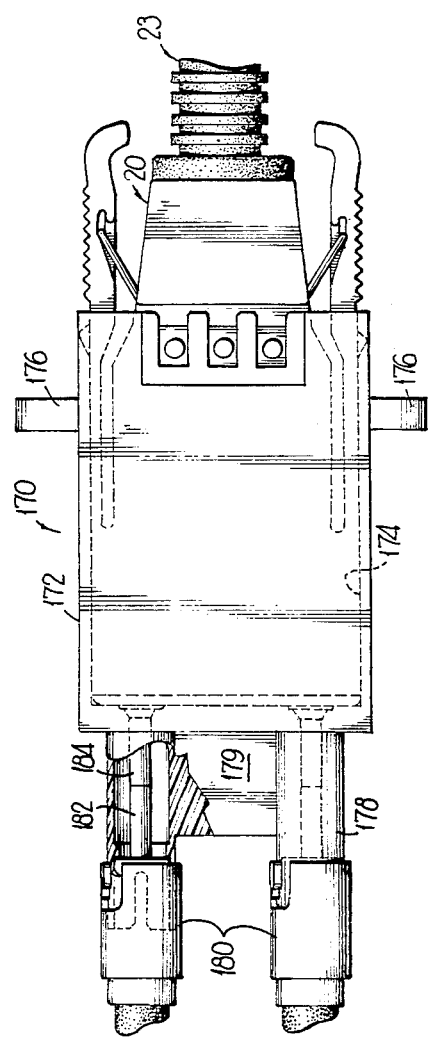

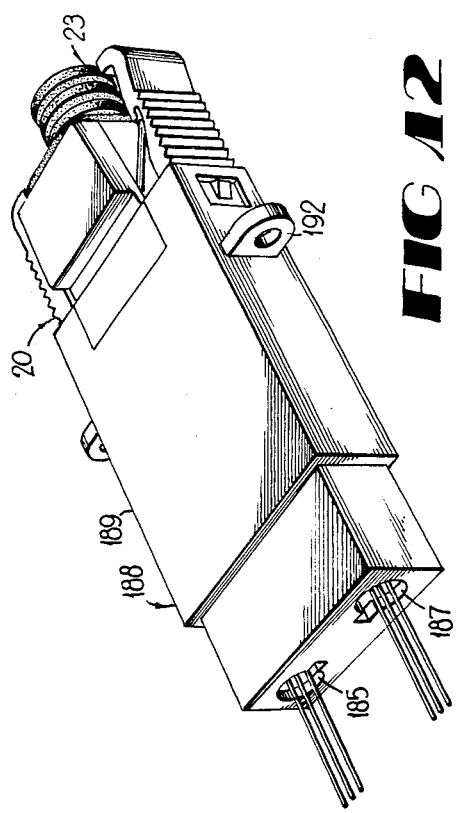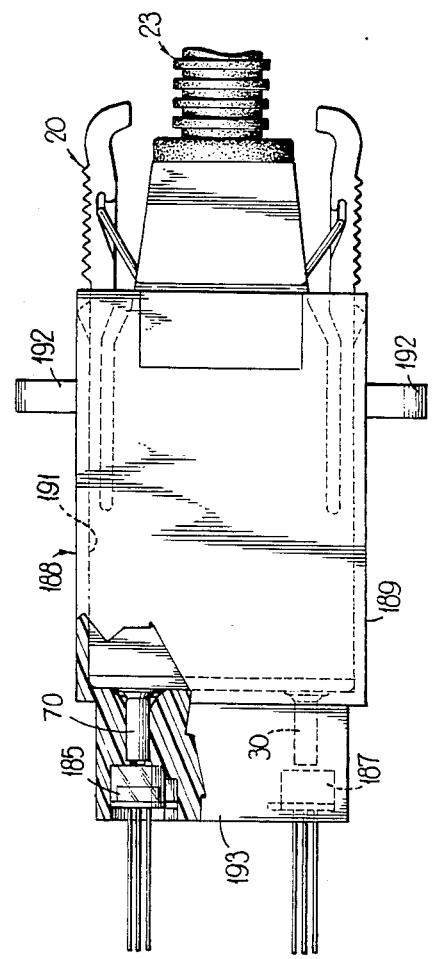

DUPLEX OPTICAL FIBER CONNECTOR

TECHNICAL FIELD

This invention relates to a duplex optical fiber connector. More particularly, it relates to a duplex straight tipped optical fiber connector which includes facilities for transferring forces imparted to a cable terminated by the connector to a housing and for protecting end portions of plug-terminated fibers provided prior to assembly with another connector or with optical devices.

BACKGROUND OF THE INVENTION

The use of optical fibers in communications is growing at an unprecendented rate. Low loss optical fibers which are produced by any of several techniques may be assembled into ribbons which are then assembled into cables, or stranded into cables, or they may be enclosed singularly in a jacket and used in various ways in a central office, or to interconnect computer networks, for example.

In order to assure that the low loss optical fibers which are produced today are not diminished in their effectiveness in systems, the fibers must be connected through intermateable connectors which preserve those low losses. For optical fiber ribbons, connectors comprise grooved chips which hold a plurality of fibers of one ribbon in alignment with fibers of another ribbon. Such a connector is shown for example in U.S. Pat. No. 3,864,018 which issued on Feb. 4, 1975 in the name of C. M. Miller. A connector which is disclosed in U.S. Pat. No. 4,634,214 which issued on Jan. 6, 1987 in the names of T. C. Cannon, et al. is used to connect single optical fibers. In it, a cylindrically shaped plug terminates a single optical fiber and is adapted to be received in a sleeve and adjacent to the plug of another such connector which terminates another single optical fiber.

Minimal loss between the connected fibers is achieved when the optical fibers which are terminated by the plugs are aligned coaxially and when the fiber end faces, each of which is planar, contact in a common plane. Considering the size of the fibers, for example one with a core diameter ranging from 8 to 62.5 microns and a cladding diameter of 125 microns, the task of providing conformable plug and sleeve surfaces in order to meet alignment and end separation requirements is a formidable one.

At relatively high bit rates, separate communications paths are used for transmit and receive links. As a result, a need for a duplex connector which is used to interconnect two optical fibers which provide these paths has developed. The duplex connector which is sought after has provisions for terminating an optical fiber cable which includes two individually buffered optical fibers. Desirably, the sought after duplex connector should be one which is capable of being assembled with another duplex connector and which is capable of being connected to optical devices such as optical data links, for example. Also, provisions should be made for providing a strain relief system to prevent the transfer of undue forces from the cable to the plugs which terminate the optical fibers.

The duplex connector should be capable of being assembled to another duplex connector through a coupling intermediate the two. When the connector is not connected to another connector, provisions must be made to protect plugs which terminate the fibers and which extend from the connector housing for entry into the coupling.

Seemingly, the prior art does not include such a connector. What the prior art does include is a duplex connector which includes a shroud inside a shroud. This fixed arrangement may be suitable for connector-to-connector assemblies, but it precludes the connection of the connector to conventional kinds of optical data links.

What the prior art lacks and what is needed is a duplex optical fiber connector which may be used for connecting two optical fibers to conventional data link assemblies as well as connecting to connector assemblies. Also, the sought after connector includes suitable strain relief provisions as well as provisions for protecting exposed plugs prior to interconnection. Further, the connector should be one in which the plugs are supported in a floating manner so that their position is somewhat adjustable during interconnection. In this way, misalignment of the plugs in the coupling is minimized.

SUMMARY OF THE INVENTION

The foregoing problems of the prior art have been overcome by the duplex optical fiber connector of this invention. The duplex optical fiber connector includes a housing which includes first and second mating portions and which includes a cable entrace end and a plug end. Optical fibers extend through force transfer facilities at the cable entrance end which are adapted to clamp non-metallic filamentary strength members of the cable to transfer tensile forces applied to the cable to the housing. The force transfer facilities include two conformable substantially smooth conically shaped surfaces which diverge in a direction from the cable entrance end of the housing toward the plug end such that any angle between successive increments of length of the strength members in engagement with and adjacent to the force transfer facilities is at least a predetermined value. Each of two optical fibers is terminated by a plug which is disposed adjacent to the plug end of the housing at least a predetermined distance from the force transfer facilities. Each of the plugs protrudes from the plug end of the housing.

The connector also includes protective facilities mounted on the housing for reciprocal movement. Prior to interconnection, the protective facilities are in an extended position to protect the protruding ends of the plugs and preparatory to interconnection are retracted to allow the ends of the plugs to engage ends of another duplex connector. In one embodiment, the protective facilities include a bumper having side arms slidably mounted in channels in the side of the housing and a center post which is spring-biased outwardly. In another embodiment, the protective facilities include a hood which also is slidably mounted on the housing and which snap-locks in an extended position to protect the protruding ends of the plugs. The hood is retractable to expose the ends of the plugs for at least proximate engagement with plugs of another duplex connector through a coupling.

BRIEF DESCRIPTION OF THE DRAWINGS

Other features of the present invention will be more readily understood from the following detailed description of specific embodiments thereof when read in conjunction with the accompanying drawings, in which:

FIG. 3 is a perspective view of two optical fiber connectors which are assembled to a coupling to provide a connection;

FIG. 4 is a plan view of the connection of FIG. 3;

FIGS. 5 and 6 are overall and detail perspective views, respectively, of the optical fiber duplex connector of FIG. 1 to show a retention system for a bumper which protects protruding ends of plugs which terminate optical fibers;

FIG. 9 is a perspective view of a connection in which a coupling is adapted to mate with two of the hoods of FIGS. 7-8;

FIGS. 10 and 11 are perspective and plan views, respectively, of a duplex connector of this invention which is assembled to an adapter to which two straight tipped connectors also are assembled;

FIGS. 12 and 13 are perspective and plan views, respectively, of a duplex connector of this invention which is assembled to an adapter to which a light-emitting diode and a detector are also assembled.

DETAILED DESCRIPTION

Figure 1:
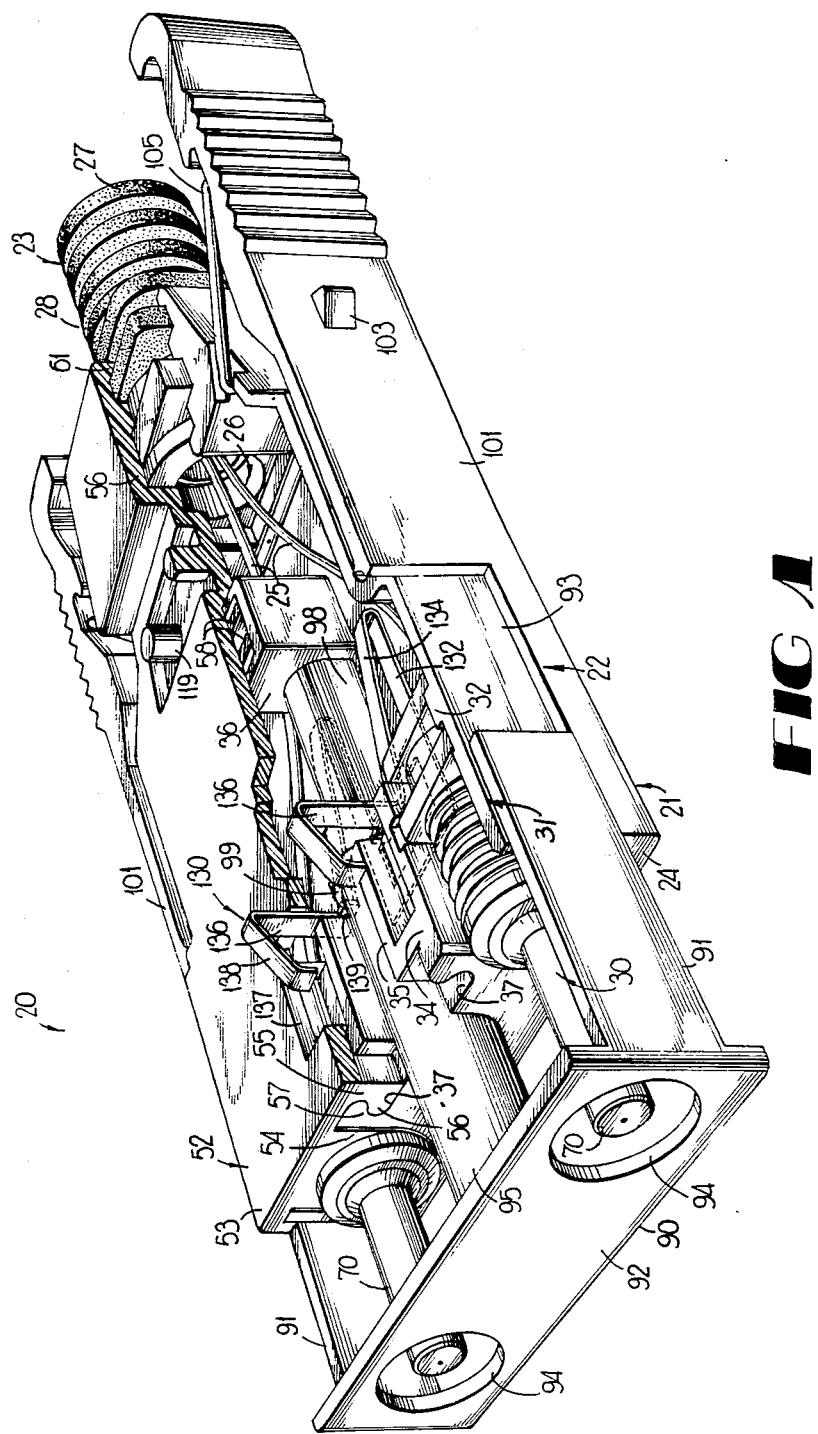
FIG. 1 is an overall perspective view of a duplex connector of this invention with portions thereof broken away.
Figure 2:
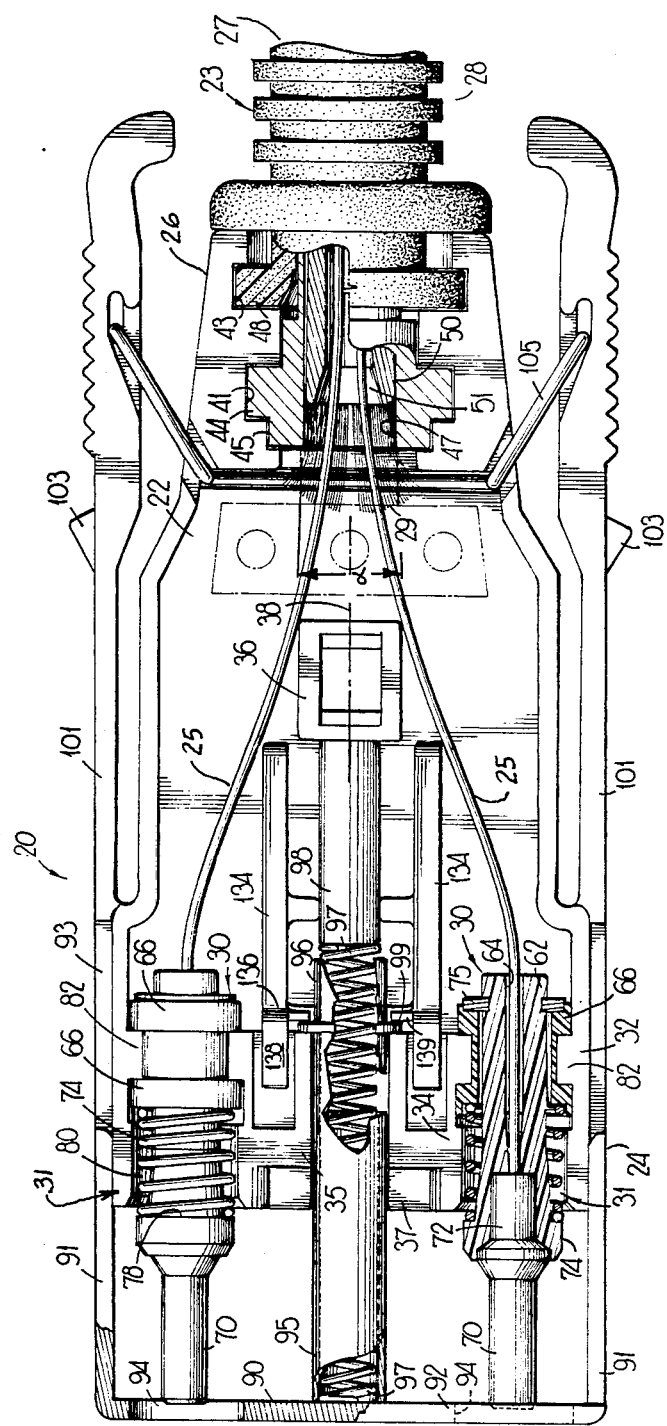
FIG. 2 is a plan view partially in section of the duplex connector of FIG. 1.

Referring now to FIGS. 1 and 2, there is shown a duplex optical fiber connector which is designated generally by the numneral 20. The duplex connector 20 includes a housing 21 having a base 22 which is adapted to hold two plugs which terminate optical fibers of a cable 23. Typically, the cable 23 includes two buffered optical fibers 25—25 each of which includes an optical fiber enclosed in a coating and a buffer layer of a plastic material such as polyvinyl chloride (PVC). The buffered optical fibers 25—25 are enclosed in a common plastic jacket 27 and a non-metallic strength member system comprising yarn 29 disposed between the optical fibers and the jacket (see FIG. 2). The base 22 is made of a rigid plastic material and includes a free or plug end 24 and a cable entry end 26 into which the cable 23 extends through a bend limiter 28.

The free end 24 includes two troughs 31—31, each adapted to receive an end portion of a connector plug assembly 30. Each trough 31 is defined by a side wall 32 of the base and by an internally disposed wall 34 having inner portions 35—35. The internally disposed walls 34—34 which define the troughs are spaced apart. Further, each of the walls 34—34 includes a recess 37 which faces outwardly toward the free end of the base.

Upstanding from the base 22 is a well 36 which is disposed centrally along a longitudinal axis 38 and which is defined by side walls having an undercut. The well 36 is used to cooperate with other portions of the housing to secure together the portions.

Adjacent to the other end 26 of the base 22 is a first cavity 41 (see FIGS. 1 and 2) and a second cavity 43. The cavity 41 is adapted to receive a flange 44 of a bushing 45 of a force transfer system to hold the bushing in the housing and to allow the cable 23 which is terminated by the bushing to extend into the housing. The bushing 45 includes a tapered passageway 47. An opposite end of the bushing extends out toward the opposite end 26 of the base. The other cavity 43 is adapted to receive a flange 48 of a strain relief sleeve of the bend limiter 28 that is positioned over the cable.

The tapered passageway 47 of the bushing 45 is designed to cooperate with a wedge 50 of the force transfer system having a bore 51 therethrough to secure the strength member yarn 29 of the cable 23 to the connector. The portion of the cable 23 which extends into the bushing has its jacket removed to expose the yarn 29 and to allow the optical fibers 25—25 to extend through the bore 51 toward the free end of the base 22. The wedge 50 is tapered and has an outer surface which is conformable to the inner tapered surface of the bushing 45. The yarn 29 is captured between the wedge 50 and the bushing 45 and the bushing is fixed with respect to the base inasmuch as its flange is received in the cavity 41. The strength member yarn is disposed between the tapered inner surface 47 of the bushing and a conformable tapered external surface of the wedge. As a result, portions of the strength member system 29 are held between these surfaces and any pull which is imparted to the cable 23 is transferred by the strength member system to the housing 21.

Desirably, an included angle, $\alpha$, between diametrically opposed lines on the inner surface of the tapered passageway 47 that appear in a sectional view when a plane is passed through the axis of revolution of that surface which generally is coincident with the longitudinal axis 38 (see FIG. 2) of the base 22, does not exceed a predetermined value. It has been found that $\alpha$ should not exceed a value of about 6° and preferably is about 3°.

Also, the included angle $\alpha$ is important in reducing the angle which portions of the strength member system make as they exit the cable 23 and become disposed between the wedge 50 and the bushing 45. The greater the angle which the portions of the strength member system 29 make with the longitudinal axis 38 of the housing 21, the greater the probability for portions of the strength member system to break about the entrance to the annular conical space between the complementary surfaces. Further, the intersection between the outer surface of the wedge 50 and its small diameter end surface is formed with a radius to preclude damage to the non-metallic strength members.

The wedge 50 and the bushing 45 cooperate to provide a self enhancing locking arrangement for the yarn 29. As pulling forces are applied to the cable 23 at the strain relief end, these forces are transferred to the portions of the strength member system 29 which causes the wedge 50 to move to the right as viewed in FIG. 2. As this occurs, the wedge 50 becomes seated further in the passageway 47 of the bushing thereby further locking the yarn and preventing any strain from being transferred to the optical fibers.

In order that the wedge 50 and the bushing 45 cooperate to hold portions of the strength member system therebetween, the conformable surfaces must be further characterized. For the portions of the non-metallic strength system not to be damaged, each of the conformable surfaces must be substantially smooth. If not, portions of the non-metallic strength member system conform to the surface roughness. As a result, non-uniform pressure as between portions of the roughened surfaces causes those portions of the strength member system to be crushed and non-effective in the transfer of forces from the cable 23 to the housing.

It should be observed that this arrangement is advantageous from several standpoints. First, a locking arrangement which is self-enhancing is provided. The greater the pull, the greater the locking of the portions of the strength member system 29 within the connector 20. Also, unlike prior art connectors, portions of the strength member system need not be retroflexed about a peripheral edge surface of a portion of the connector to secure the portions within the connector. Instead, the force-transfer portions of the strength member system are disposed at a relatively gentle angle to the longitudinal axis 38 of the housing between two substantially smooth surfaces.

Adapted to be secured to the base is a cover 52 (see FIG. 1) which also is made of a plastic material. One end 53 of the cover which is adapted to mate with the free end of the base includes a pair of clamping rings 54—54 disposed along each external edge. Each pair of clamping rings includes two rings each having an arcuate surface that is configured to engage and clamp against an outer surface of the connector plug assembly which is received in the associated trough.

Also, the one end 53 of the cover 52 includes two spaced depending posts 55—55 which are adapted to be received in the outwardly facing recesses 37—37 of the walls of the base which face toward the free end of the base. Each of the posts 55—55 includes a hook-shaped end 56 which is adapted to engage an undercut portion 57 of the associated wall to help secure the cover to the base. Further, the cover includes two additional posts 58—58 which extend from the central portion of the cover. Each of those posts also is provided with a hook (not shown) that is adapted to be received in the well 36 of the base 22 and to become engaged with ledges of undercut portions thereof.

An opposite end portion of the cover 52 is provided with a clamping ring 56 having an accurately shaped surface adapted to engage an outer surface of the tapered bushing. Further, at the end of that end portion of the cover are formed two posts 61—61 that are adapted to be received under ledges adjacent to the cable end of the base.

It should also be noted that the distance between the inner ends of the plug assemblies 30—30 and the force transfer system is important to achieve minimal bending of the optical fibers within the connector housing. Bending of the optical fibers must be minimized to avoid micro- and macrobending losses.

The plug end of the base 22 is adapted to hold the two plug assemblies each designated with the numeral 30. Each of the plug assemblies 30 includes a body portion 62 which includes a passageway 64 extending therethrough and two spaced collars 66—66. A plug 70 which is cylindrical and which may be made of a plastic, ceramic, metallic or glass material is adapted to have one of its end portions, designated 72, received in the passageway. The end portion 72 has its end fitted with a retaining ring 75 which engages an outer surface of an outermost collar 66. A compression spring 74 is disposed about the plug 70 between the other collar 66 and a shoulder 78 which is an integral part of to the plug.

As can be seen in FIG. 2, the base 22 includes two nests 80—80 at the plug end of the housing defined by the troughs 31—31. Each of the troughs 31—31 includes a pair of opposed lips 82—82. When a plug assembly 30 is received in a nest 80, the pair of lips 82—82 associated with that nest are received between the collars 66—66 of the body portion 62 of the plug assembly. This arrangement holds the plug assemblies 30—30 within the nests. However, when the connector 20 is assembled with another connector or an optical device, such as a data link, for example, each plug 70 is capable of being moved within the housing. As the plug engages a plug of another assembly, the spring 74 about each of the plugs is compressed and the retaining ring 75 at the end of the plug is disengaged from the outer surface of the outermost collar 66 of the body portion. The plugs 70—70 are spring-loaded and typically make end face contact although they could seat on the shoulders 78—78 thereof. This spring mounting is effective to accommodate tolerance variations in the housing and in a coupling which interconnects the connectors.

The connector 20 also includes provisions for protecting the exposed plug ends when the connector is not assembled to another connector or to an optical device. In one embodiment which is shown in FIGS. 1 and 2, the protective provisions include a bumper 90. The bumper 90 includes two legs 91—91 and a crossbar 92 which is attached to the legs. Each of the legs 91—91 is received in a groove 93 (see FIG. 1) formed on an outer side surface of the base portion 22. The crossbar 92 includes two spaced openings 94—94 which are aligned with the plugs, and which are adapted to allow the plugs to protrude therethrough to engage other plugs or optical devices.

Extending inwardly from the crossbar 92 is a hollow post 95 having a semi-cylindrical end portion 96. Disposed within the semicylindrical end portion 96 is a compression spring 97 which is adapted to engage an end of a rib 98 formed in the housing base portion 22. The post 95 also includes a flange 99 which engages inner ends of the trough walls 35—35 of the housing portion when the spring 97 engages the end of the rib 98. Also, when the post 95 is so disposed, its half shell end portion is disposed about the curved upper surface of the rib 98.

In this manner, the bumper 90 is held to the housing base portion 22 such that it is capable of being moved toward the plugs 70—70. When the connector 20 is to be assembled to another connector, forces are applied to the bumper 90 to cause the bumper to be moved toward the plugs. As this occurs, the spring 97 is compressed, the flange 99 disengages the trough wall 35, and the legs 91—91 are moved slidably along the grooves 93—93 in the side walls of the housing base 22.

The housing 21 is formed to include two flexible, molded plastic sidearms 101—101 (see FIGS. 1 and 2) each of which is attached to the housing adjacent to its midpoint. Free ends of the arms are adjacent to the strain relief portion of the cable. Each arm 101 is provided with a latching nub 103 between its free end and its point of attachment to the housing. Further, a wire-like link 105 connects the free end of each flexible sidearm 101 to the base 22 to prevent excessive outward movement of the free end of the sidearm.

Each of two duplex connectors is adapted to be received in an end of a coupling which is designated generally by the numeral 110 (see FIGS. 3 and 4). The coupling 110 includes two end portions 112—112 each having a cavity 114 for receiving a connector housing 21. The coupling 110 is polarized so that each end includes a channel 116 in one major surface thereof and a plurality of slots 118—118 in an opposing major surface. When a connector housing 21 is inserted into one of the cavities 114—114, a raised portion 117 disposed on an outwardly facing surface of the base of the connector housing is received in the channel 116 whereas pins 119—119 extending outwardly from the cover are received in the slots 118—118.

The duplex connector 20 of this invention is provided with a coding arrangement for identification. One of the mating housing portions, the cover portion 52, includes the plurality of pins 119—119 projecting from a surface thereof. These pins are adopted to be received in openings in the coupling. In accordance with a prearranged scheme, one or more of those pins may be removed and an insert 115 (see FIG. 3) having a number of openings corresponding to the number of pins is provided in the coupling.

The two end portions of the coupling 110 are joined through a center portion 120 which includes two tunnels 122—122 each opening at its ends to the cavities 114—114. When connectors 20—20 are positioned in the cavities 114—114 of the coupling, protruding plugs 70—70 of each duplex connector extend into the tunnels and abut to complete the connection (see FIG. 4). Also, the latching nubs 103—103 of the flexible arms 101—101 are received in windows 124—124 formed in side walls 126—126 of the end portions of the coupler. To withdraw a connector and break a connection, a user need only to apply finger forces to the free ends of the flexible arms 101—101 which causes the latching nubs 103—103 to be moved out of the windows 124—124 to permit withdrawal of the connector from the cavity.

The connector 20 also includes provisions which prevent inadvertent retraction of the bumper 90 when the connector is not disposed in a coupling cavity. These provisions include a flat spring member 130 (see FIGS. 1-2 and 5-6) which is disposed in the housing 21. The spring member includes a U-shaped portion 132 which engages the base 22 and two retroflexed portions 134—134 which extend from a location adjacent to the well 36 (see FIG. 2) to a location adjacent to inner surfaces of the walls 35—35. Leg portions 136—136 extend from ends of the retroflexed portions in a direction generally parallel to the walls 35—35 and toward the cover 52. Ends of the leg portions 136—136 are joined to ramp portions 138—138 which extend through openings 137—137 of the cover 52 and which are inclined toward the base 22 as they extend toward the free end of the housing. Each leg portion includes a tang 139 which extends inwardly toward the longitudinal centerline 38 of the base.

In an unconnected condition, the flange 99 of the post 95 engages outer surfaces of the tangs 139—139. As a result, the tangs 139—139 prevent the post and hence the bumper from being moved toward the cable end of the housing 21. However, when the housing is inserted into a coupling, the ramp portions of the spring engage camming surfaces inside the coupling housing and are caused to be depressed. As a result, the tangs 139—139 are moved toward the base 22 of the housing thereby disengaging the flange 99 on the post 95. This allows the bumper 90 to be moved toward the housing 21 to expose the plugs 70—70 for connective engagement with plugs 70—70 of another connector which has been moved into the opposite cavity.

Figure 7:
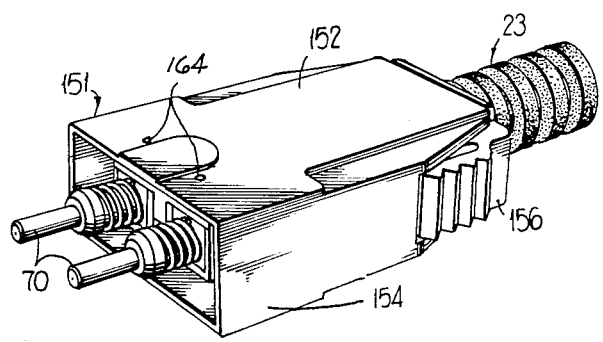
FIG. 7-8 are perspective views of a duplex connector of this invention which includes a hood for providing protection for protruding ends of plugs that terminate optical fibers.
Figure 8:
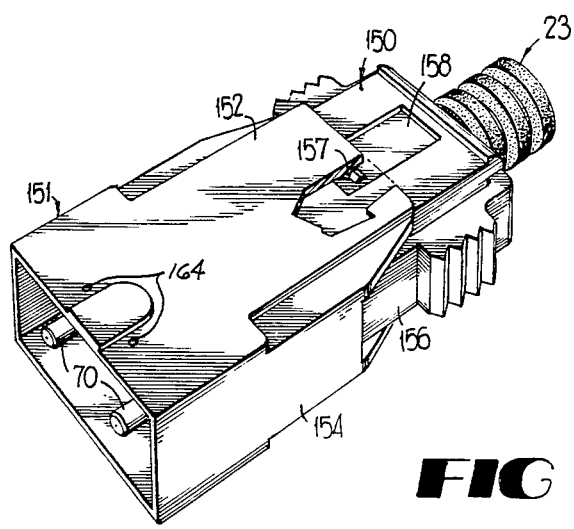

In another embodiment which is shown in FIGS. 7-9, a modified connector housing 150 is provided with a hood 141 which is mounted slideably on the housing. The hood includes a rear portion 152 which covers the housing and a protective portion 154 which spans across two flexible arms 156—156 of the base. It should be observed that in this embodiment, the flexible arms 156—156 are attached to the base adjacent to its cable end instead of adjacent to its plug end as in the embodiment shown in FIGS. 1 and 2. Tabs 157—157 which project inwardly from each of the rear portions 152—152 are disposed in shallow wells 158—158 in major surfaces of the connector housing to limit the movement of the hood along the housing. At its forward limit of travel, the hood 151 covers the end portions of the plugs 70—70 which extend from the housing.

The hood 151 and the housing 150 are arranged so that an end of a coupling 161 is received in the protective portion of the hood. Afterwards, a user moves the housing 150 inwardly of the coupling 161. This causes the hood 151 to assume a retracted position relative to the housing 150. Also, side-walls of the coupling become disposed between free end portions 162—162 of the arms 156—156 such that latches 165—165 of the free end portions extend into windows 163—163 formed in the side walls of the coupling housing. When disengagement is sought, a user depresses the other ends of the flexible arms adjacent to their attachment to the housing to cause the end portions 162—162 to flex inwardly. Then forces are applied to the hood 151 to disengage it from the coupling.

The coupling 161 includes two passageways 166—166 which are adapted to receive plugs of connectors to be assembled together. Each of the passageways 166—166 is stepped with a smaller diameter inner portion adapted to receive end portions of the plugs and outer enlarged portions adapted to receive the shoulder 78 and spring portion of each plug assembly. The inner portion of each passageway is continuous across the plane where the two plugs become engaged with each other.

Also, the coupling 161 includes a button 167 projecting outwardly from each of two opposed walls. The buttons are adapted to be received in recesses 164—164 in the hood 151. When withdrawing the connector 20 from the coupling, a user moves the connector outwardly until the tabs 157—157 become disposed between arcuately shaped raised portions 168—168 in the wells 158—158 and walls 169—169 without overriding the button engagement with the recesses. Subsequently, additional forces applied to the connector cause the disengagement of the buttons with the recesses allowing total withdrawal of the connector.

In FIGS. 10 and 11, there is shown a connective arrangement for connecting a duplex connector 20 to a pair of optical fibers which have been terminated individually by ST ® connectors. Features of the ST ® connector are shown in priorly identified U.S. Pat. No. 4,634,214. The connective arrangement includes a duplex connector 20 which terminates a cable 23 and a coupling which is designated generally by the numeral 170.

The coupling 170 includes a housing 172 having a cavity 174 for receiving the housing of the connector 20 and two projecting tabs 176—176 which may be used to secure the coupling to a frame (not shown). Also, the coupling housing 172 includes two cylindrically shaped silos 178—178 connected through a stiffener 179. Each of the silos is adapted to receive an ST ® connector 180 such that a plug 182 thereof is received interiorly of the silo to abut a plug 184 of the duplex connector 20.

The versatility of the connector 20 is further shown in FIGS. 12 and 13 where it is used to connect two optical fibers to a light emitting diode (LED) 185 and to a photodiode detector 187 through a coupling 188. The coupling 188 includes a housing 189 having a cavity 191 for receiving the housing of the duplex connector and tabs 192—192 for securing the coupling to a frame (not shown). As is seen in FIG. 13, plugs 30—30 of the connector 20 extend from the connector into proximate engagement with the LED 185 and the detector 187 which are supported in a portion 193 of the housing 189.

Figure 14:
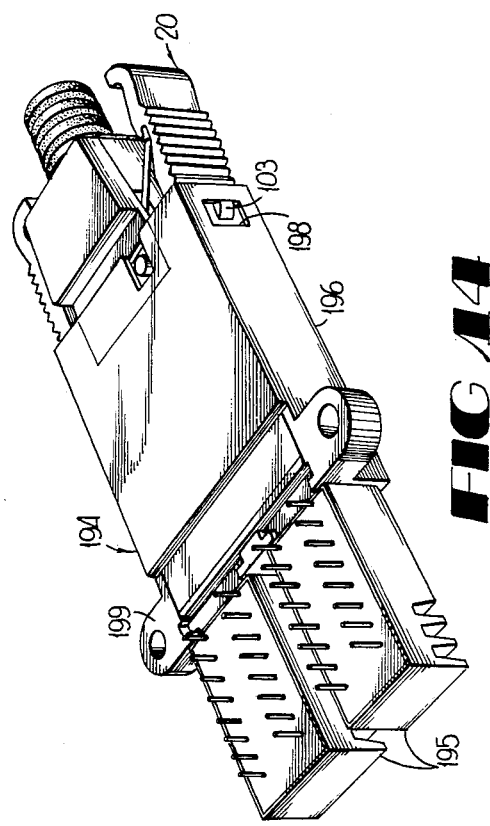
FIGS. 14 and 15 are perspective and plan views, respectively, of a duplex connector of this invention which is assembled to an adapter to which data links also are assembled.
Figure 15:
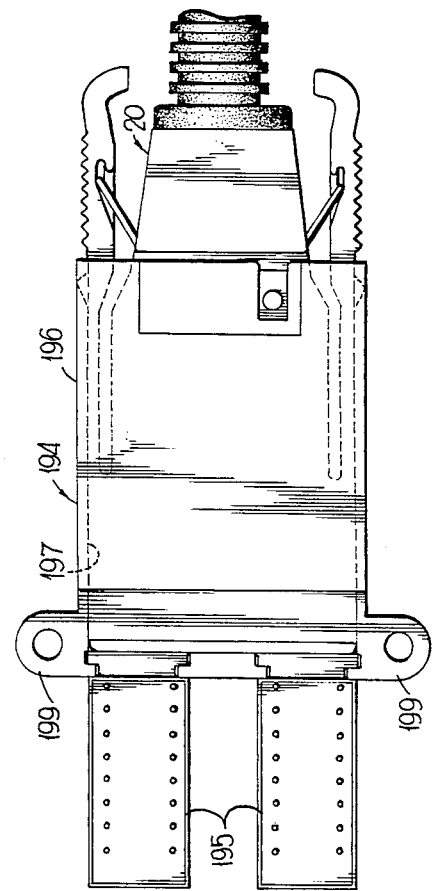

Still further, the duplex connector 20 may be connected through an adapter 194 (see FIGS. 14 and 15) to optical data link transmitters and receivers 195—195. The adapter 194 includes a housing 196 having a cavity 197 for receiving the connector housing and windows 198—198 into which extend the detents to secure the connector in the adapter. The adapter 194 also includes tabs 199—199 for securing the adapter to a printed circuit board (not shown).

It is to be understood that the above-described arrangements are simply illustrative of the invention. Other arrangements may be devised by those skilled in the art which will embody principles of the invention and fall within the spirit and scope thereof.

What is claimed is:

1. A duplex optical fiber connector for terminating two optical fibers of a cable and being adapted to be joined to another connector, said duplex connector comprising:

a housing which comprises first and second mating portions and which includes a cable entrance end and a plug end;

force transfer means adapted to be disposed adjacent to said cable entrance end and through which the optical fibers extend for transferring tensile forces applied to the cable to the housing;

plug means adapted to be associated with each of the optical fibers and disposed within said housing adjacent to said plug end of said housing a predetermined distance from said force transfer means, each said plug means including a plug adapted to be associated with and to terminate one of the optical fibers of the cable, and protruding from said plug end of said housing; and protective means mounted on said housing in which said plug means are disposed for reciprocal movement with respect to said housing for protecting end portions of the plugs which protrude from said housing and which is caused to be retracted when said connector is joined to another connector to expose said plugs and allow them to be operatively connected to plugs of the other connector.

2. The duplex optical fiber connector of claim 1, wherein said protective means includes bumper means mounted for reciprocal movement with respect to said housing and being effective in a first position for protecting ends of said plugs and in a second position being retracted to allow ends of the plugs to engage ends of the plugs of another duplex connector, and wherein said force transfer means is effective to clamp non-metallic filamentary strength members of the cable and includes two conformable substantially smooth conically shaped surfaces which diverge in a direction from said cable entrance end of said housing toward said plug end such that any angle between successive portions of length of the strength members in engagement with and adjacent to said surfaces is at least a predetermined value.

3. The duplex optical fiber connector of claim 2, wherein said plug means includes an end portion which includes two spaced collars and a passageway therethrough and a plug which extends through and from said end portion and which includes a shoulder fixed to an end of said plug, and an associated compression spring which is disposed about said plug and which engages one of said spaced collars and said shoulder, each of said plug means adapted to be mounted in one of said mating portions of said housing, said housing including opposing lips which are received between said spaced collars to hold said plug means therein such that forces applied to each said plug causes the associated spring to be compressed and said plug to be moved through said passageway in said end portion of said plug means and into said housing.

4. The duplex optical fiber connector of claim 2, wherein said housing includes two flexible sidearms each being attached to said housing adjacent to said plug end of said housing and having a free end adjacent to said cable end, each of said sidearms including a latching nub which extends outwardly and which is adapted to be received in a window of a coupling into which said connector is adapted to be received to become operatively connected to another said connector.

5. The duplex optical fiber connector of claim 2, wherein said bumper means includes an end portion which extends parallel to an end face of the connector and two depending side portions each being received in a groove of a sidewall of one of the mating portions of said housing, said bumper means also including a post which extends inwardly into said housing from said end portion and a spring disposed between an end of said post and an abutment within said one portion of said housing, said end portion of said bumper means also including two spaced openings each being aligned with one of said plugs and spaced therefrom so that the end portion of each said plug is protected from impact and so that each plug may be moved through its associated opening to provide a connection with another plug.

6. The duplex connector of claim 5, which also includes spring means which is disposed in said housing and which in an unoperated condition engages a portion of said post of said bumper means and is effective to prevent retrograde movement of said bumper means and which in an operated condition is disengaged from said bumper means to allow said bumper means to be moved toward said cable end of said connector to expose said plugs.

7. The duplex connector of claim 6, wherein said housing includes a cover and a base and said spring means is supported in said base with spaced ramp portions extending through openings in said cover and wherein said post of said bumper means includes a collar disposed adjacent to said abutment, said ramp portions being adapted to be engaged by camming portions which extend into a cavity of a coupling in which a plug end portion of said connector is adapted to be received to cam said ramp portions inwardly and move tabs extending from legs, which connect said ramp portions which support portions adjacent to said base, toward said base to disengage said tabs from the collar which is disposed about an inner end of said post so that when said end portion of said bumper means engages the coupling, said bumper means is allowed to be moved toward said cable end of said housing upon further movement of said connector into the coupling cavity.

8. The duplex connector of claim 1, wherein said protective means includes a hood which is slidably mounted on said housing, said hood being adapted to receive an end portion of a coupling having a center portion into which said plugs are adapted to extend to operatively connect to plugs of another connector which is received in the other end of the coupling, said housing including two sidearms each being attached to said cable end of said housing and having a free end which includes a latching nub adjacent to said plug end, said hood being adapted to snap-lock into an extended position to protect said plugs and in a retracted position adapted to allow said latching nubs of said arms to become disposed in windows of the coupling into which two of said duplex connectors are adapted to be assembled to connect associated optical fibers thereof.

9. The connector of claim 2, wherein said force transfer means includes.
 a bushing which is disposed in said housing and which includes a tapered passageway which is defined by a substantially smooth surface; and
 a truncated conically shaped wedging member which is received in said passageway of said bushing and which has an outer surface which is substantially smooth and comformable to said surface of said bushing, said bushing and said wedging member cooperating to receive an end of the cable in a small diameter portion of said passageway with the non-metallic strength members being disposed between said surface of said bushing and said outer surface of said wedging member, said wedging member having a longitudinally extending bore through which optical fibers of the cable extend.

10. The connector of claim 9, wherein a line disposed on the surface of the wedging member and disposed in a plane that passes through the longitudinal axis of the wedging member makes an angle of about 1.5 degrees with the longitudinal axis of the wedging member.

11. A terminated optical fiber cable, which comprises:
 an optical fiber cable which includes two individually buffered optical fibers, a plurality of non-metallic strength members and a jacket which encloses the two optical fibers; and
 a duplex optical fiber connector terminating said cable, said connector comprising:
  a housing which includes a base and a cover mated with said base and which includes a plug end and a cable input end;
  force transfer means supported in said base and including conformable conically shaped surfaces which diverge in a direction from said cable input end and between which are captured portions of said strength members with small diameter portions of each conically shaped surface being oriented toward said cable input end of said housing to cause the strength members upon initial engagement with said force transfer means to be in engagement with said small diameter portions, such that any angle between successive portions of length of the strength members in engagement with and adjacent to said surfaces is at least a predetermined value;
  plug means disposed in said housing adjacent to said plug end thereof, said plug means including two plugs each of which terminates one of the optical fibers of the cable for connecting the terminated optical fibers to other light paths disposed in apparatus to which said housing is adapted to be connected; and
  reciprocally mounted means mounted on said housing for protecting said plug means prior to interconnecting said plug means with other light paths.

12. The terminated optical fiber cable of claim 11, wherein said plug means includes an end portion which includes two spaced collars and a passageway therethrough and a plug which extends through and from said end portion and which includes a shoulder fixed to an end of said plug, and an associated compression spring which is disposed about said plug and which engages one of said spaced collars and said shoulder, each of said plug means mounted in one of said mating portions of said housing, said housing including opposing lips which are received between said spaced collars to hold said plug means therein such that forces applied to each said plug cause the associated spring to be compressed and said plug to be moved through said passageway in said end portion of said plug means and into said housing.

13. The terminated optical fiber cable of claim 12, wherein said housing includes two flexible sidearms each being attached to said housing adjacent to said plug end of said housing and having a free end adjacent to said cable end, each of said sidearms including a latching nub which extends outwardly and which is adapted to be received in a window of a coupling into which said connector is adapted to be received to become operatively connected to another said connector.

14. The terminated optical fiber cable of claim 13, wherein said means for protecting said plug means includes bumper means which includes an end portion which extends parallel to an end face of the connector and two depending side portions each being received in a groove of a sidewall of one of the mating portions of said housing, said bumper means also including a post which extends inwardly into said housing from said end portion and a spring disposed between an end of said post and an abutment within said one portion of said housing, said end portion of said bumper means also including two spaced openings each being aligned with one of said plugs and spaced therefrom so that the end portion of each said plug is protected from impact and so that each plug may be moved through its associated opening to provide a connection with another plug.

15. The terminated optical fiber cable of claim 14, wherein said housing includes spring means disposed in said housing, said spring means in an unoperated condition engaging said bumper means to prevent retrograde movement of said bumper means and which in an operated condition is disengaged from said bumper means to allow said bumper means to be moved toward said cable end of said connector to expose said plugs, said spring means including portions supported in said base, and ramp portions extending through openings in said cover, said ramp portions adapted to be engaged by camming portions which extend into a cavity of a coupling into which a plug end portion of said connector is adapted to be received to cam said ramp portions inwardly and move tabs extending from legs, which connect said ramp portions with support portions adjacent to said base, toward said base to disengage said tabs from a collar which is disposed about an inner end of said post so that when said end portion of said bumper means engages said coupling, said bumper means is allowed to be moved toward said cable end of said housing upon further movement of said connector into the coupling cavity.

16. The terminated optical fiber cable of claim 15, wherein wherein said force transfer means includes
a bushing which is disposed in said housing and which includes a tapered passageway which is defined by a substantially smooth surface; and
a truncated conically shaped wedging member which is received in said passageway of said bushing and which has an outer surface which is substantially smooth and conformable to said surface of said bushing, said bushing and said wedging member cooperating to hold an end of the cable in a small diameter portion of said passageway with the non-metallic strength members being disposed between said surface of said bushing and said outer surface of said wedging member to cause tensile loads applied to the cable to be transferred to the bushing to prevent damage to the optical fibers which are terminated by said plug means, said wedging member having a longitudinally extending bore through which optical fibers of the cable extend.

17. The terminated optical fiber cable of claim 16, wherein a line disposed on the surface of the wedging member and disposed in a plane that passes through a longitudinal axis of the wedging member makes an angle of about 1.5 degrees with the longitudinal axis of the wedging member.

18. An optical fiber connection system for interconnecting a terminated optical fiber cable, which comprises an optical fiber cable which includes two individually buffered optical fibers, a plurality of non-metallic strength members and a jacket which encloses the two optical fibers, with other light paths, said system comprising;
a duplex optical fiber connector which comprises:
a housing which includes a base and a cover mated with said base and which includes a plug end and a cable input end;
force transfer means supported in said base and including conformable conically shaped surfaces between which are adapted to be captured portions of said strength member system with small diameter portions of each conically shaped surface being oriented toward said cable input end of said housing to cause the strength members upon initial engagement with said force transfer means to be in engagement with said small diameter portions, such that any angle between successive portions of length of the strength members in engagement with and adjacent to said surfaces is at least a predetermined value;
plug means disposed in said housing adjacent to said plug end thereof, said plug means including two plugs each of which is adapted to terminate one of the optical fibers of the cable for connecting the terminated optical fibers to other light paths disposed in apparatus to which said housing is connected; and
reciprocally movable means mounted on said housing for protecting said plug means prior to interconnecting said plug means with other light paths; and
a coupling which includes two end portions and a center portion, at least one of said end portions including a cavity adapted to receive the housing of a terminated optical fiber cable and said center portion including two tunnels which communicate with said cavity of said one end portion, said tunnels adapted to receive plugs which terminate optical fibers so that their end faces are adjacent to the other light paths.

19. The optical fiber connection system of claim 18, wherein said plug means includes an end portion which includes two spaced collars and a passageway therethrough and a plug which extends through and from said end portion and which includes a shoulder fixed to an end of said plug, and an associated compression spring which is disposed about said plug and which engages one of said spaced collars and said shoulder, each of said plug means adapted to be mounted in one of said mating portions of said housing, said housing including opposing lips which are received between said spaced collars to hold said plug means therein such that forces applied to each said plug cause the associated spring to be compressed and said plug to be moved through said passageway in said end portion of said plug means and into said housing.

20. The optical fiber connection system of claim 19, wherein said housing includes two flexible sidearms each being attached to said housing adjacent to said plug end of said housing and having a free end adjacent to said cable end, each of said sidearms including a latching nub which extends outwardly and which is adapted to be received in a window of said coupling into which said connector is adapted to be received to become operatively connected to other light paths.

21. The optical fiber connection system of claim 20, wherein said means for protecting said plug means includes bumper means which includes an end portion which extends parallel to an end face of the connector and two depending side portions each being received in a groove of a sidewall of one of the mating portions of said housing, said bumper means also including a post which extends inwardly into said housing from said end portion and a spring disposed between an end of said post and an abutment within said one portion of said housing, said end portion of said bumper means also including two spaced openings each being aligned with one of said plugs and spaced therefrom so that the end portion of each said plug is protected from impact and so that each plug may be moved through its associated opening to provide a connection with another light path.

22. The optical fiber connection system of claim 21, wherein said housing includes spring means disposed in said housing, said spring means in an unoperated condition engaging said bumper means to prevent retrograde movement of said bumper means and which in an operated condition is disengaged from said bumper means to allow said bumper means to be moved toward said cable end of said connector to expose said plugs, said spring means including portions supported in said base, and ramp portions extending through openings in said cover, said ramp portions adapted to be engaged by camming portions which extend into a cavity of said coupling into which the plug end portion of said connector is adapted to be received to cam said ramp portions inwardly and move tabs extending from legs, which connect said ramp portions with support portions adjacent to said base, toward said base to disengage said tabs from a collar which is disposed about an inner end of said post so that when said end portion of said bumper means engages said coupling, said bumper means is allowed to be moved toward said cable end of said housing upon further movement of said connector into the coupling cavity.

23. The optical fiber connection system of claim 18, wherein said reciprocally movable means includes a hood which is slidably mounted on said housing, said hood being adapted to receive an end portion of said coupling having a center portion into which said plugs are adapted to extend to operatively connect to other light paths at the other end of the coupling, said housing including two sidearms each being attached to said cable end of said housing and having a free end which includes a latching nub adjacent to said plug end, said hood being adapted to snap-lock into an extended position to protect said plugs and in a retracted position adapted to allow said latching nubs of said arms to become disposed in windows of said coupling.

24. The optical fiber connection system of claim 18, wherein said force transfer means includes
   a bushing which is disposed in said housing and which includes a tapered passageway which is defined by a substantially smooth surface; and
   a truncated conically shaped wedging member which is received in said passageway of said bushing and which has an outer surface which is substantially smooth and conformable to said surface of said bushing, said bushing and said wedging member cooperating to receive an end of the cable in a small diameter portion of said passageway with the non-metallic strength members being disposed between said surface of said bushing and said outer surface of said wedging member to cause tensile loads applied to the cable to be transferred to the bushing to prevent damage to the optical fibers which are terminated by said plug means, said wedging member having a longitudinally extending bore through which optical fibers of the cable extend.

25. An optical fiber connection, which comprises:
   first and second terminated optical fiber cables, each of which includes:
      an optical fiber cable which includes two individually buffered optical fibers, a plurality of non-metallic strength members and a jacket which encloses the two optical fibers; and
      a duplex optical fiber connector for terminating said cable, said connector comprising:
      a housing which includes a base and a cover mated with said base and which includes a plug end and a cable input end;
         force transfer means supported in said base and including conformable conically shaped surfaces between which are captured portions of said strength members with small diameter portions of each conically shaped surface being oriented toward said cable input end of said housing to cause the strength members upon initial engagement with said force transfer means to be in engagement with said small diameter portions, such that any angle between successive portions of length of the strength members in engagement with and adjacent to said surfaces is at least a predetermined value;
         plug means disposed in said housing adjacent to said plug end thereof, said plug means including two plugs each of which terminates one of the optical fibers of the cable for connecting the terminated optical fibers to other light paths disposed in apparatus to which said housing is connected; and
         reciprocally movable means mounted on said housing for protecting said plug means prior to interconnecting said plug means with the other light paths; and
      a coupling which includes a housing having two end portions and a center portion, each of said end portions including a cavity in which is received a housing of one of the terminated optical fiber cables and said center portion including two tunnels which communicate the cavities of said end portions, said plugs which terminate the optical fibers being received in said tunnels so that their end faces are adjacent to the other light paths.

26. The optical fiber connection of claim 25, wherein said plug means includes an end portion which includes two spaced collars and a passageway therethrough and a plug which extends through and from said end portion and which includes a shoulder fixed to an end of said plug, and an associated compression spring which is disposed about said plug and which engages one of said spaced collars and said shoulder each of said plug means adapted to be mounted in one of said mating portions of said housing, said housing including opposing lips which are received between said spaced collars to hold said plug means therein such that forces applied to each said plug causes the associated spring to be compressed and said plug to be moved through said passageway in said end portion of said plug means and into said housing.

27. The optical fiber connection of claim 26, wherein said housing includes two flexible sidearms each being attached to said housing adjacent to said plug end of said housing and having a free end adjacent to said cable end, each of said sidearms including a latching nub which extends outwardly and which is received in a window of said coupling in which said connector is received and connected to another said connector.

28. The optical fiber connection of claim 27, wherein said means for protecting said plug means includes bumper means which includes an end portion which extends parallel to an end face of the connector and two depending side portions each being received in a groove of a sidewall of one of the mating portions of said housing, said bumper means also including a post which extends inwardly into said housing from said end portion and a spring disposed between an end of said post and an abutment within said one portion of said housing, said end portion of said bumper means also including two spaced openings each being aligned with one of said plugs and spaced therefrom so that the end portion of each said plug is protected from impact prior to making the connection and so that each plug may be moved through its associated opening to provide the connection with the other plug.

29. The optical fiber connection of claim 28, wherein said housing includes spring means disposed in said housing, said spring means in an unoperated condition engaging said bumper means to prevent retrograde movement of said bumper means and which in an operated condition is disengaged from said bumper means to allow said bumper means to be moved toward said cable end of said connector to expose said plugs, said spring means including portions supported in said base, and ramp portions extending through openings in said cover, said ramp portions adapted to be engaged by camming portions which extend into said cavity of said coupling into which the plug end portion of each said connector is received to cam said ramp portions inwardly and move tabs extending from legs, which connect said ramp portions with support portions adjacent to said base, toward said base to disengage said tabs from a collar which is disposed about an inner end of said post so that when said end portion of said bumper means engaged said coupling, said bumper means was allowed to be moved toward said cable end of said housing upon further movement of said connector into the coupling cavity.

30. The optical fiber connection of claim 25, wherein said protective means includes a hood which is slidably mounted on said housing, each said hood receiving an end portion of said coupling, said housing including two sidearms each being attached to said cable end of said housing and having a free end which includes a latching nub adjacent to said plug end, said hood being adapted to snap-lock into an extended position to protect said plugs and in a retracted position adapted to allow said latching nubs of said arms to become disposed in windows of said coupling into which two of said duplex connectors are assembled to connect associated optical fibers thereof.

31. The optical fiber connection of claim 25, wherein said force transfer means includes a bushing which is disposed in said housing and which includes a tapered passageway which is defined by a substantially smooth surface; and a truncated conically shaped wedging member which is received in said passageway of said bushing and which has an outer surface which is substantially smooth and conformable to said surface of said bushing, said bushing and said wedging member cooperating to hold and end of the cable in a small diameter portion of said passageway with the non-metallic strength members being disposed between said surface of said bushing and said outer surface of said wedging member, said wedging member having a longitudinally extending bore through which optical fibers of the cable extend.

32. The optical fiber connection of claim 31, wherein a line disposed on the surface of the wedging member and disposed in a plane that passes through a longitudinal axis of the wedging member makes an angle of about 1.5 degrees with the longitudinal axis of the wedging member.

33. A housing for a duplex optical fiber connector which is used to terminate two optical fibers of a cable, said housing including:

a base which comprises a cable entrance end and a plug end, said plug end being adapted to hold two plugs each of which terminates an optical fiber;

a cover which is adapted to be mated with said base;

force transfer means adapted to be disposed adjacent to said cable entrance end and through which the optical fibers extend for clamping non-metallic filamentary strength members of the cable to transfer tensile forces applied to the cable to the housing, said force transfer means including two conformable substantially smooth conically shaped surfaces which diverge in a direction from said cable entrance end of said housing toward said plug end such that any angle between successive portions of length of the strength members in engagement with and adjacent to said force transfer means is at least a predetermined value; and protective means mounted for reciprocal movement with respect to said housing for protecting end portions of the plugs which protrude from said housing and which is caused to be retracted when the connector is connected to another to expose the plugs and allow them to be operatively connected to plugs of the other connector.

34. The housing of claim 33, wherein said protective means includes bumper means mounted for reciprocal movement with respect to said housing and being effective in a normal unoperated condition for protecting ends of the plugs and in an operated condition being retracted to allow ends of the plugs to be exposed and to engage ends of the plugs of another duplex connector.

35. The housing of claim 34, wherein said means for protecting the plugs means includes bumper means which includes an end portion which extends parallel to an end face of the connector and two depending side portions each being received in a groove of a sidewall of one of the mating portions of said housing, said bumper means also including a post which extends inwardly into said housing from said end portion and a spring disposed between an end of said post and an abutment within said one portion of said housing, said end portion of said bumper means also including two spaced openings each being aligned with one of the plugs and spaced therefrom so that the end portion of each plug is protected from impact and so that each plug may be moved through its associated opening to provide a connection with another plug.

36. The housing of claim 35, wherein said housing includes spring means disposed in said housing, said spring means in an unoperated condition engaging said bumper means to prevent retrograde movement of said bumper means and which in an operated condition is disengaged from said bumper means to allow said bumper means to be moved toward said cable end of said connector housing to expose the plugs, said spring means including portions supported in said base, and ramp portions extending through openings in said cover, said ramp portions adapted to be engaged by camming portions which extend into a cavity of a coupling into which a plug end portion of said connector housing is adapted to be received to cam said ramp portions inwardly and move tabs extending from legs, which connect said ramp portions with support portions adjacent to said base, toward said base to disengage said tabs from a collar which is disposed about an inner end of said post so that when said end portion of said bumper means engages the coupling, said bumper means is allowed to be moved toward said cable end of said housing upon further movement of said connector housing into the coupling cavity.

* * * * *